(12) United States Patent
Risthaus et al.

(10) Patent No.: US 7,951,260 B2
(45) Date of Patent: May 31, 2011

(54) HYBRID COMPONENTS CONTAINING REACTIVE HOTMELT ADHESIVES

(75) Inventors: Martin Risthaus, Dorsten (DE); Hans-Joachim Wönicker, Stuttgart (DE)

(73) Assignee: Evonik Degussa GmbH, Essen (DE)

( * ) Notice: Subject to any disclaimer, the term of this patent is extended or adjusted under 35 U.S.C. 154(b) by 1170 days.

(21) Appl. No.: 11/623,830

(22) Filed: Jan. 17, 2007

(65) Prior Publication Data

US 2007/0163709 A1    Jul. 19, 2007

(51) Int. Cl.
 *B32B 7/12*    (2006.01)
 *B05D 5/10*    (2006.01)
 *B05D 7/00*    (2006.01)

(52) U.S. Cl. ..... 156/327; 427/216; 427/220; 427/372.2; 427/375; 427/379; 427/384

(58) Field of Classification Search ............... 428/458, 428/474.4; 156/327; 427/208.2, 216, 220, 427/372.2, 375, 379, 384, 427.5
See application file for complete search history.

(56) References Cited

U.S. PATENT DOCUMENTS 4,957,979 A * 9/1990 Albini et al. ............... 525/420.5

FOREIGN PATENT DOCUMENTS

| DE | 103 61 096 A1 | 7/2005 |
| WO | WO 2005/035685 A1 | 4/2005 |

\* cited by examiner

*Primary Examiner* — Thao T. Tran
(74) *Attorney, Agent, or Firm* — Oblon, Spivak, McClelland, Maier & Neustadt, L.L.P.

(57) ABSTRACT

Reactive hotmelt adhesives based on copolyamide can be used in hybrid components. These hybrid components find application in, for example, vehicle construction and aircraft construction.

11 Claims, 1 Drawing Sheet

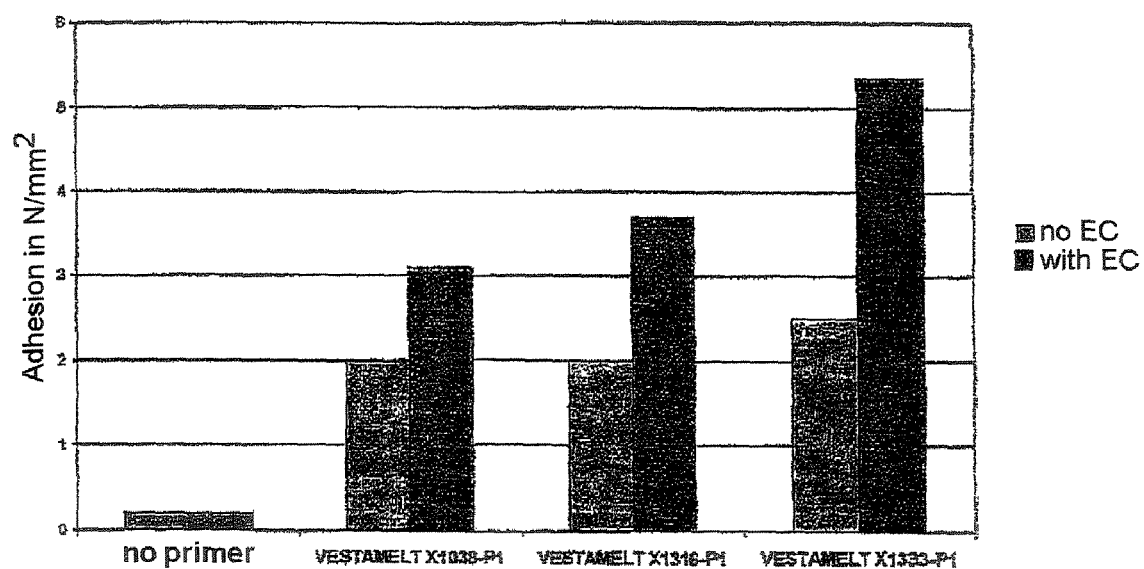

HYBRID COMPONENTS CONTAINING REACTIVE HOTMELT ADHESIVES

BACKGROUND OF THE INVENTION

1. Field of the Invention

The present invention describes the use of reactive hotmelt adhesives in hybrid components (structural components).

2. Discussion of the Background

Structural components are components with subordinate aesthetic requirements which are employed in the construction both of vehicles and of aircraft in the area of load-bearing parts and of force-accommodating parts.

The structural components of the present invention are notable in particular for the local reinforcements they have, which give the component particular mechanical properties. The increase in torsional rigidity with additional weight reduction is particularly noteworthy in the present invention as compared with existing components.

The hybrid components described in the present invention are notable in particular for the fact that they consist of an assembly of principally metals with polymers. A polymer structure is inserted by means of injection moulding techniques into a metal component, and gives the component the appropriate torsional rigidity and crash rigidity in addition to comparatively low weight.

The weak point in conventional hybrid components to date has been the attachment of the polymer to the metallic material. Here, as a result of contraction and different expansion coefficients in the various materials, disbanding of the constituents occurs, leading to deterioration in the mechanical properties. At the present time, conventional structure-forming hybrid components are produced by injection-moulding a polymeric material into a metallic material. The problem with this physical join is the transition between the polymer and the metal, since the materials have different mechanical properties, leading to an adverse effect on the strength of the assembly, as a result of shrinking of the polymer, for example, and hence likewise adversely affecting the torsional rigidity of the components.

SUMMARY OF THE INVENTION

It is an object of the present invention to overcome the above mentioned disadvantages of conventional structural elements.

This and other objects have been achieved by the present invention the first embodiment of which includes a process for producing a hybrid component, comprising:
  bonding a metal to a polymer by a copolyamide-based hotmelt adhesive;
  thereby obtaining said hybrid component comprising said metal and said polymer.

BRIEF DESCRIPTION OF DRAWING

The FIGURE shows the adhesion between metal and polymer with or without cathodic electrocoating (EC).

DETAILED DESCRIPTION OF THE INVENTION

It has now surprisingly been found that by using reactive adhesives it is possible to overcome the disadvantages of conventional structural elements.

The preliminary coating of the metallic component with constructive hotmelt adhesives based on laurolactam produces substantially better attachment of the two constituents and an improved corrosion resistance in the hybrid components. This effect can be further enhanced if blocked isocyanates, which have a constructive action in terms of molecular weight, and epoxides, which act as cross-linkers and to promote adhesion, are added to the hotmelt adhesive used. The constructive effect on molecular weight is promoted by the cathodic electrocoating (EC coating) needed for the component for corrosion protection, since the residence time of more than 25 minutes in electrocoating at temperatures above 150° C. generates the heightened cohesive strength and adhesive strength required for these components. Under the stated temperature loads, purely thermoplastic hotmelt adhesives undergo thermal degradation and hence adversely affect the mechanical properties of the component. The hotmelt adhesive of the present invention displays generally very good affinities with metallic materials, and is employed in the hybrid components as an adhesion promoter between the metal and the polymer.

A further advantage of the hotmelt adhesive used according to the present invention is the improvement in corrosion resistance. Hitherto there were problems in the area of the connection between the metal and the injection moulding compound. The low shrinkage of the polymer, described above, causing the formation of a small gap in which the EC electrocoat is absent and so corrosion is produced on the untreated metal. The preliminary coating with the reactive hotmelt adhesive compensates the shrinkage and prevents the formation of a corrosion-susceptible gap.

The present invention, then, involves applying a primer (hotmelt adhesive) to the metallic material that substantially improves the assembly and hence has a positive influence on the crash behaviour, which is required in particular in vehicle construction.

The primer is a laurolactam-based copolyamide having a fraction of 2.5% to 15% by weight, preferably 4% to 6% by weight, of blocked isocyanate and 2.5% to 10% by weight, preferably 4% to 6% by weight, of epoxide each based on the weight of the laurolactam-based copolyamide. The amount of blocked isocyanate includes all values and subvalues therebetween, especially including 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14 and 14.5% by weight. The amount of epoxide includes all values and subvalues therebetween, especially including 3, 3.5, 4, 4.5, 5, 5.5, 6, 6.5, 7, 7.5, 8, 8.5, 9 and 9.5% by weight. These adjuvants create an assembly with metallic materials that is substantially better than with purely thermoplastic copolyamides, and under the effect of temperature they provide for a constructive effect on molecular weight, which substantially improves the temperature stability of the join. In one embodiment, the duration of temperature exposure is important for the constructive effect on molecular weight. An optimum has been found to encompass 150° C. to 190° C. for a period of 10 to 30 minutes, which are conditions typically applied in an EC oven. The temperature includes all values and subvalues therebetween, especially including 155, 160, 165, 170, 175, 180 and 185° C. The time period includes all values and subvalues therebetween, especially including 12, 14, 16, 18, 20, 22, 24, 26 and 28 min.

The hotmelt adhesives are not particularly limited as long as they are copolyamide based. Preferably, the hotmelt adhesives are copolyamides based on laurolactam. Even more preferably, the hotmelt adhesives used are, for example, the VESTAMELT grades from Degussa:
  X1038-P1: 60% laurolactam+25% caprolactam+15% AH salt (mixture of 50% adipic acid and 50% hexamethylenediamine)

X1316-P1: 95% VESTAMELT X1038-P1+5% VESTAGON BF1540-P1

X1333-P1: 95% VESTAMELT X1038-P1+5% VESTAGON BF1540-P1+5% Araldite GT7004

Features of the process of the present invention are that a metal profile is first coated, over its full area or partially, with a copolyamide hotmelt adhesive, by means of electrostatic spray gun or by way of suitable coating systems, and then is heated at about 150° C. over a time of approximately 120 to 300 seconds, preferably approximately 150 seconds, in order to cause incipient melting of the adhesive. The heating time includes all values and subvalues therebetween, especially including 130, 140, 150, 160, 170, 180, 190, 200, 210, 220, 230, 240, 250, 260, 270, 280 and 290 seconds. As the subsequent step, a polymer structure is introduced by means of injection moulding technology. This structure-forming component then passes through an EC oven for coating. Preferably, the EC coating takes place at approximately 190° C. for a time of approximately 30 minutes.

The hybrid components of the present invention find application in vehicle construction, in the air-travel industry, in rail construction, etc; one typical application is in the sector of front ends (bumpers).

Having generally described this invention, a further understanding can be obtained by reference to certain specific examples which are provided herein for purposes of illustration only, and are not intended to be limiting unless otherwise specified.

EXAMPLES

In order to illustrate the improvement in adhesion, tensile tests were carried out on corresponding metal/plastic assemblies which had been joined using different VESTAMELT hotmelt adhesives. In order to emphasize the effect of temperature, samples were investigated both before and after EC treatment (190° C., 30 min). Untreated specimen parts, without primer (hotmelt adhesive), had very low adhesion, which, as is shown in the FIGURE, could be substantially improved through the use of polyamide hotmelt adhesives. This produced an enormous improvement in the mechanical properties of later components, so that a substantially greater importance was accorded to their use as structure-forming components.

The metals ought to be degreased prior to coating, in order to start out with uniform surfaces and to avoid a scatter in the adhesion values. A further advantage, for wetting, is the preheating of the metal parts to 60 to 80° C.

German patent application 10 2006 002 125.8 filed Jan. 17, 2006, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for producing a hybrid component, comprising:
   bonding a metal to a polymer with a copolyamide-based hotmelt adhesive;
   thereby obtaining said hybrid component comprising said metal and said polymer;
   wherein said metal is coated with said copolyamide-based hotmelt adhesive, to obtain a coated metal; and
   wherein said coated metal is bonded to said polymer;
   wherein said metal is coated by an electrostatic spray gun, to obtain said coated metal;
   wherein said coated metal is heated at about 150° C. over a time of approximately 120 to 300 seconds in order to cause incipient melting of the adhesive;
   wherein said polymer is introduced by injection moulding, to obtain a structure-forming component which then passes through an EC oven for coating a temperature of 150° C. to 190° C. for a period of 10 to 30 minutes.

2. The process according to claim 1, wherein said metal is bonded to said polymer with a copolyamide based hotmelt adhesive further comprising isocyanate and epoxide.

3. The process according to claim 1 or 2, wherein said copolyamide is based on laurolactam.

4. The process according to claim 1, wherein said hotmelt adhesive comprises 2.5% to 15% of blocked isocyanate and 2.5% to 10% of epoxide.

5. The process according to claim 1, further comprising:
   coating said metal over its full area with said hotmelt adhesive using an electrostatic spray gun or a suitable coating system, and
   sintering incipiently at 150° C. for approximately 150 s.

6. The process according to claim 1, further comprising:
   partially coating said metal with said hotmelt adhesive using an electrostatic spray gun or a suitable coating system, and
   sintering incipiently at 150° C. for approximately 150 s.

7. The process according to claim 4, wherein said hybrid component subsequently passes through an EC oven for coating.

8. The process according to claim 1, further comprising degreasing of said metal.

9. The process according to claim 1, further comprising preheating of the metal to 60 to 80° C.

10. The process according to claim 1, wherein said hotmelt adhesive is based on laurolactam and comprises a blocked isocyanate and an epoxide.

11. The process according to claim 1, wherein said hybrid is exposed to a temperature of 150° C. to 190° C. for a period of 10 to 30 minutes in a cathodic electrocoating oven.

* * * * *

UNITED STATES PATENT AND TRADEMARK OFFICE
CERTIFICATE OF CORRECTION

| | | |
|---|---|---|
| PATENT NO. | : 7,951,260 B2 | Page 1 of 1 |
| APPLICATION NO. | : 11/623830 | |
| DATED | : May 31, 2011 | |
| INVENTOR(S) | : Martin Risthaus et al. | |

It is certified that error appears in the above-identified patent and that said Letters Patent is hereby corrected as shown below:

On the title page, Item (30), the Foreign Application Priority Data has been omitted.
Item (30) should read:

Item -- (30)  Foreign Application Priority Data

Jan. 17, 2006   (DE) ..................................... 102006002125.8 --

Signed and Sealed this
Nineteenth Day of July, 2011

David J. Kappos
*Director of the United States Patent and Trademark Office*